(12) United States Patent
Otani (10) Patent No.: US 11,190,656 B2
(45) Date of Patent: Nov. 30, 2021

(54) IMAGE SCANNING APPARATUS (71) Applicant: KYOCERA Document Solutions Inc., Osaka (JP)

(72) Inventor: Akizo Otani, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/080,091

(22) Filed: Oct. 26, 2020

(65) Prior Publication Data
US 2021/0127024 A1 Apr. 29, 2021

(30) Foreign Application Priority Data

Oct. 29, 2019 (JP) .............................. JP2019-196710

(51) Int. Cl.
H04N 1/04 (2006.01)
H04N 1/00 (2006.01)
H04N 1/028 (2006.01)
H04N 1/10 (2006.01)

(52) U.S. Cl.
CPC ..... H04N 1/00551 (2013.01); H04N 1/02815 (2013.01); H04N 1/1061 (2013.01)

(58) Field of Classification Search
CPC ........... H04N 1/00551; H04N 1/02815; H04N 1/1061
USPC ............... 358/474, 488, 486, 497, 496, 498; 399/379, 380
See application file for complete search history.

(56) References Cited

U.S. PATENT DOCUMENTS

| 2004/0165223 | A1 | 8/2004 | Ishido | |
| 2009/0080031 | A1* | 3/2009 | Ishido | H04N 1/00551 358/449 |
| 2010/0103479 | A1* | 4/2010 | Seo | H04N 1/00681 358/474 |
| 2016/0021270 | A1* | 1/2016 | Misaka | H04N 1/00692 358/461 |
| 2016/0373599 | A1* | 12/2016 | Misaka | H04N 1/00007 |
| 2018/0309895 | A1* | 10/2018 | Shimizu | H04N 1/00816 |
| 2020/0014805 | A1* | 1/2020 | Kitaichi | H04N 1/407 |

FOREIGN PATENT DOCUMENTS

| JP | H04-261565 | 9/1992 |
| JP | 2004-258386 | 9/2004 |

* cited by examiner

Primary Examiner — Cheukfan Lee (57) ABSTRACT

An image scanning unit optically scans an image of a predetermined scanning area that includes a platen glass on which a document is put. A document cover is capable of rotation and covers the platen glass. A first movable member moves in a direction substantially perpendicular to the platen glass in accordance with opening and closing of the document cover. A second movable member moves in a direction substantially parallel to the platen glass in accordance with movement of the first movable member when the first movable member contacts. A cover status detecting unit obtains the image from the image scanning unit and detects a status of the document cover on the basis of an image of the second movable member in the scanning area.

5 Claims, 7 Drawing Sheets

IMAGE SCANNING APPARATUS

CROSS-REFERENCE TO RELATED APPLICATIONS

This application relates to and claims priority rights from Japanese Patent Application No. 2019-196710, filed on Oct. 29, 2019, the entire disclosures of which are hereby incorporated by reference herein.

BACKGROUND

1. Field of the Present Disclosure

The present disclosure relates to an image scanning apparatus.

2. Description of the Related Art

An image scanning apparatus includes a sensor flag that moves in accordance with opening and closing a document cover, and two or three optical sensors that detect a position of the sensor flag among two or three steps; and detects opening of the document cover as one of plural detection steps on the basis of outputs of the optical sensors.

However, in the aforementioned image scanning apparatus, the optical sensors corresponding to the number of the detection steps must be installed because the aforementioned image scanning apparatus detects opening of the document cover as one of plural steps; and consequently, the apparatus requires large cost.

SUMMARY

An image scanning apparatus according to an aspect of the present disclosure includes a platen glass on which a document is put, an image scanning unit, a document cover, a first movable member, a second movable member, and a cover status detecting unit. The image scanning unit is configured to optically scan an image of a predetermined scanning area that includes the platen glass. The document cover is configured to be capable of rotation and cover the platen glass. The first movable member is configured to move in a direction substantially perpendicular to the platen glass in accordance with opening and closing of the document cover. The second movable member is configured to move in a direction substantially parallel to the platen glass in accordance with movement of the first movable member when the first movable member contacts. The cover status detecting unit is configured to obtain the image from the image scanning unit and detect a status of the document cover on the basis of an image of the second movable member in the scanning area.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
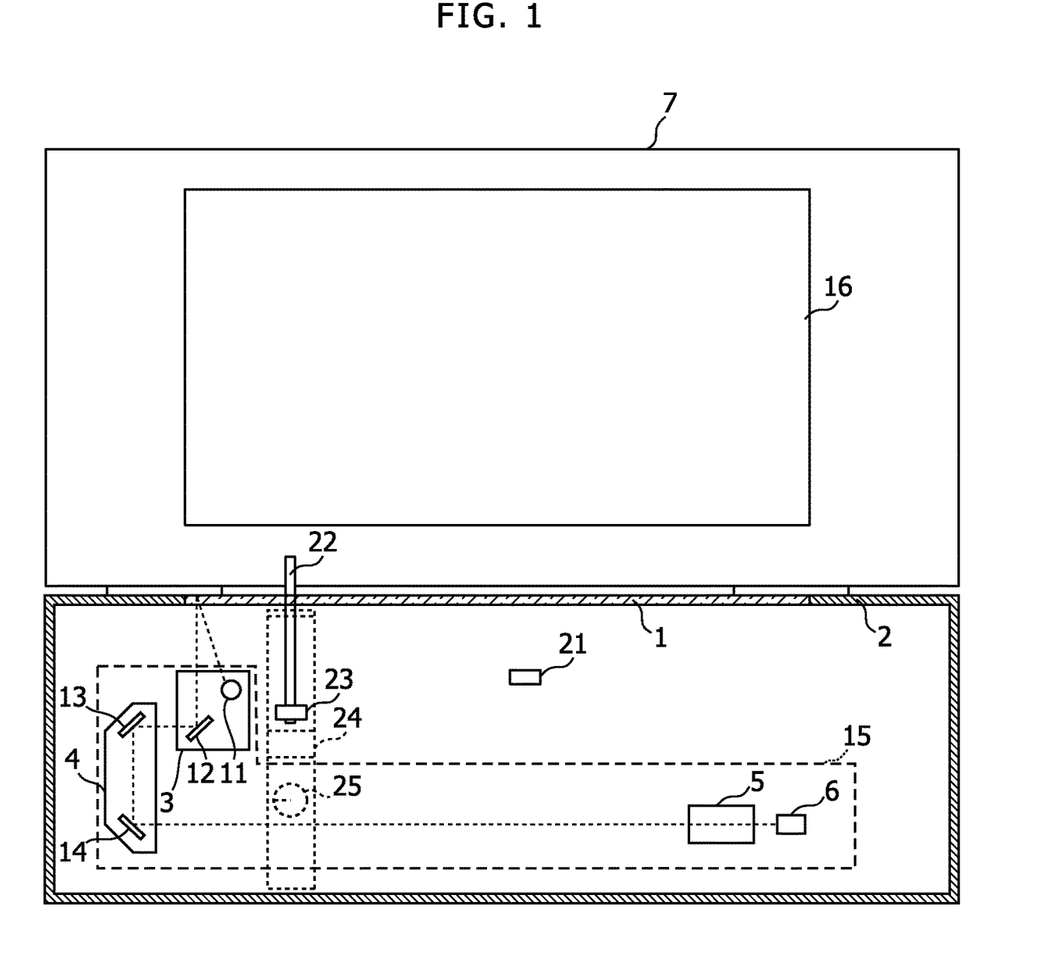
FIG. 1 shows a front view diagram that indicates an internal configuration of an image scanning apparatus in an embodiment of this disclosure.
Figure 2:
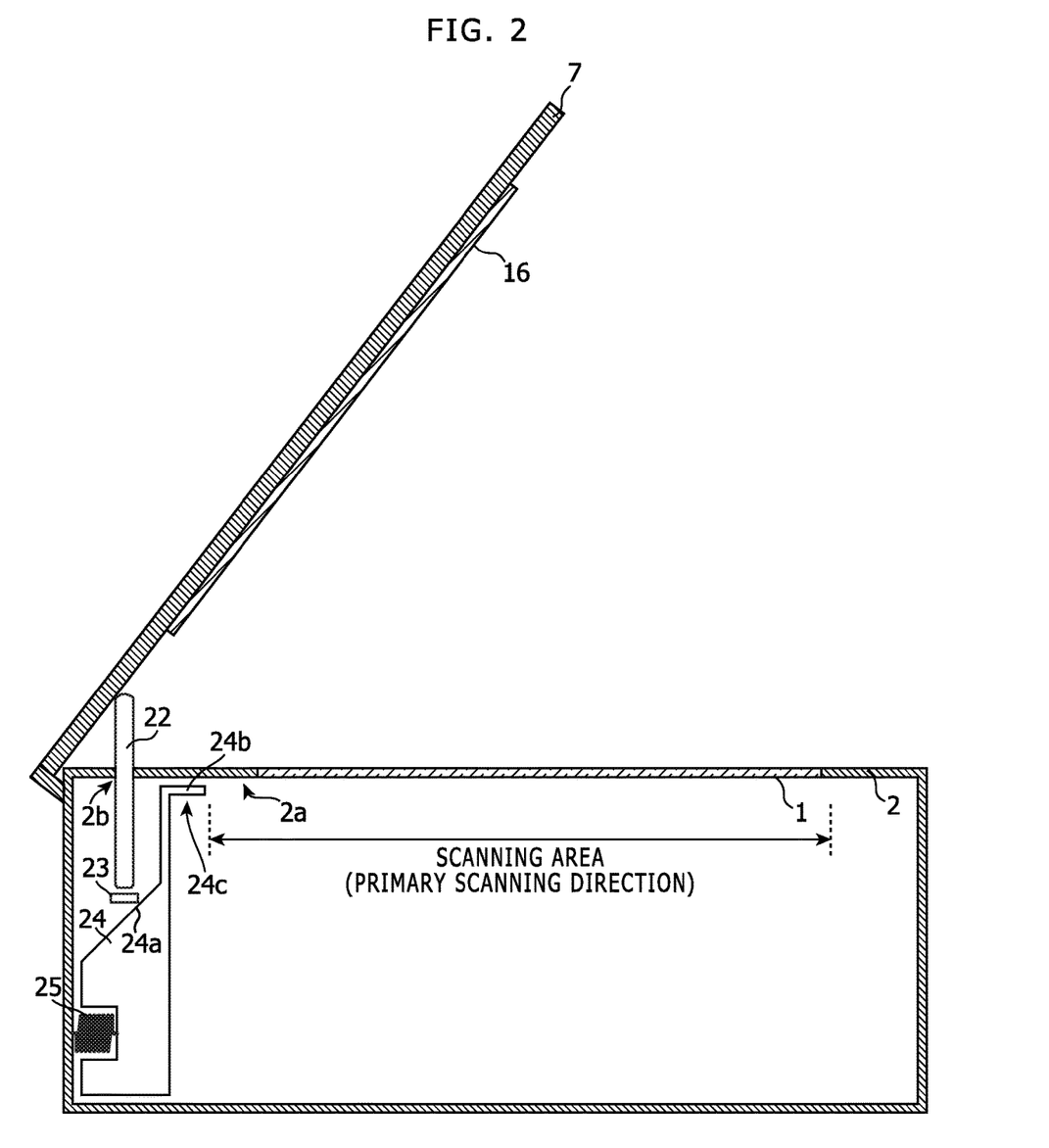
FIG. 2 shows a side view diagram that indicates an internal configuration of an image scanning apparatus in an embodiment of this disclosure.

FIG. 1 shows a front view diagram that indicates an internal configuration of an image scanning apparatus in an embodiment of this disclosure. FIG. 2 shows a side view diagram that indicates an internal configuration of an image scanning apparatus in an embodiment of this disclosure. The image scanning apparatus shown in FIGS. 1 and 2 is an apparatus such as scanner, copier, or digital multi-function peripheral.

In FIGS. 1 and 2, a platen glass 1 is disposed on a top surface of a housing 2 of the image scanning apparatus, and is a transparent document table on which a document is put when a document image is scanned from the document.

Further, a carriage 3 is installed so as to be capable of moving in the secondary scanning direction with an unshown driving source. The carriage 3 includes a lamp 11 and a mirror 12. The lamp 11 is arranged along a primary scanning direction, and emits light, for example, with aligned plural light emitting diodes. The light emitted from the lamp 11 falls on a document put on the platen grass 1, a ceiling surface 2 of an inner wall of the housing 2, a protrusion part 24b of a second movable member 24 mentioned below or the like correspondingly to a position of the carriage 3. The mirror 12 reflects reflected light from the document or the like. Further, the carriage 4 is capable of moving together with the carriage 3 in a secondary scanning direction with an unshown driving source. The carriage 4 includes mirrors 13 and 14, and the mirrors 13 and 14 reflect light from the mirror 12 of the carriage 3 twice, and outputs the light in the secondary scanning direction.

An imaging lens 5 focuses the light from the mirror 14 on an image sensor 6. The image sensor 6 is an image sensor that includes light sensing elements corresponding to the predetermined number of pixels aligned in the primary scanning direction, and outputs electronic signals which indicate respective light amounts sensed on the pixels line by line. For example, the image sensor 6 may be a CCD (Charge Coupled Device). Thus, the lamp 11 irradiates a scanning position with light, and the image sensor 6 detects reflected light from the scanning position as an image.

The carriages 3 and 4, the imaging lens 5, the image sensor 6, the light source 11, the mirror 12, and the mirrors 13 and 14 and the like compose an image scanning unit 15.

The image scanning unit 15 optically scans an image of a predetermined scanning area that includes the platen glass 1. The scanning area includes a document put on the platen glass 1, a document presser 16 of the document cover 7 or the like.

As shown in FIGS. 1 and 2, the document cover 7 is a substantially flat-plate-shaped member arranged so as to be capable of rotation around a backside rotatable end thereof or near as a rotation axis. The document cover 7 includes the white document presser 16 that presses a document put on the platen glass 1. The document cover 7 causes the document to uniformly contact to the platen glass 1, and covers the platen glass 1 and consequently restrains environmental light entering an inside of the apparatus through the platen glass 1 when scanning an image.

Further, the image scanning apparatus includes a document detection sensor 21, a first movable member 22, an optical sensor 23, a second movable member 24, and a spring 25.

The document detection sensor 21 is an optical sensor that is arranged at a predetermined position (a predetermined position in the secondary scanning direction) under the platen glass 1, and detects whether a document exists at this position or not.

Figure 3:
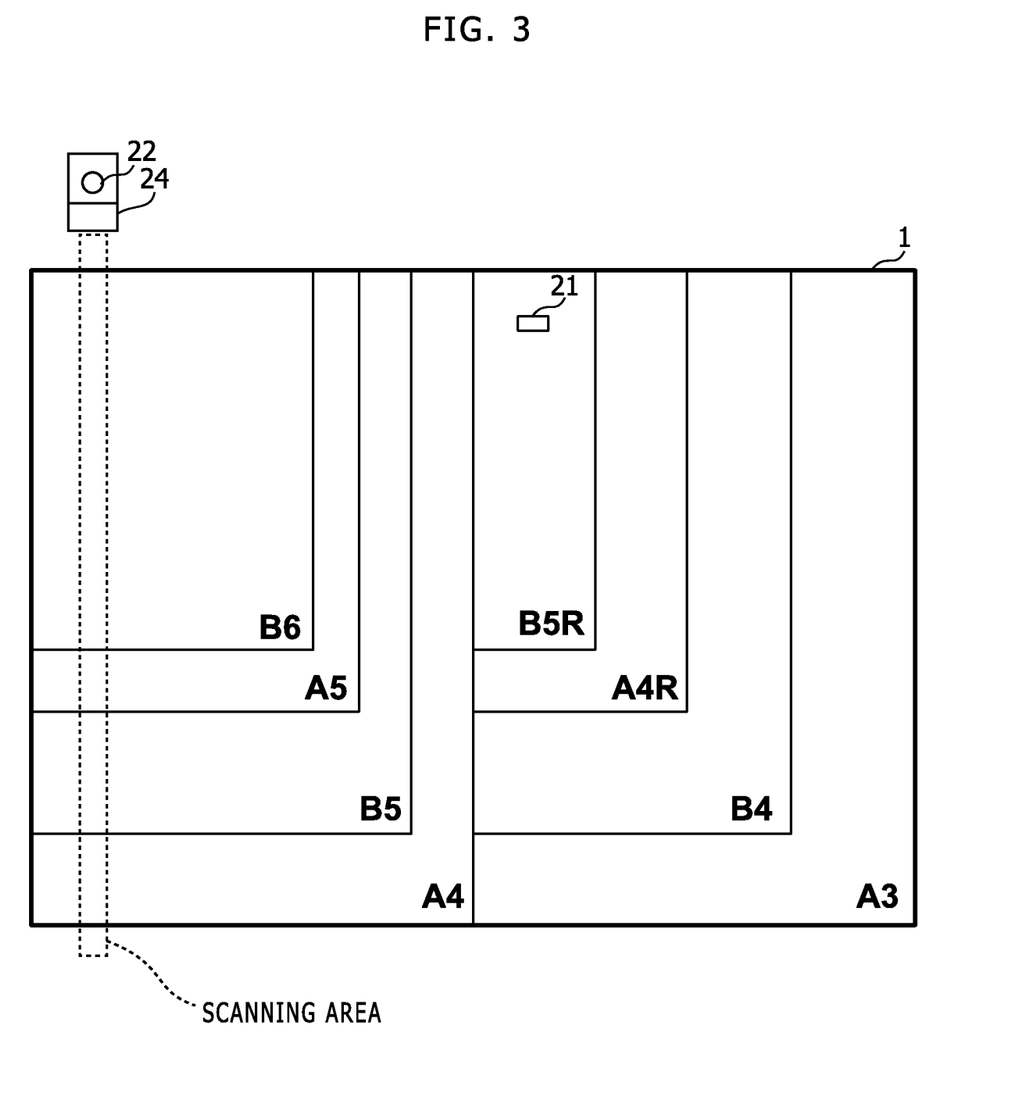
FIG. 3 shows a top view diagram that explains an arrangement position of a document detection sensor 21 in the image scanning apparatus shown in FIGS. 1 and 2.

FIG. 3 shows a top view diagram that explains an arrangement position of the document detection sensor 21 in the image scanning apparatus shown in FIGS. 1 and 2. Using the document detection sensor 21 arranged as shown in FIG. 3, documents having the same primary-scanning-directional widths can be classified. For example, in a case that a primary-scanning-directional width of the document is the width of B6 or BSR, if the document is detected by the document detection sensor 21, then it is determined that the document size is BSR, and otherwise if not, then it is determined that the document size is B6. Similarly, in a case that a primary-scanning-directional width of the document is the width of A5 or A4R, if the document is detected by the document detection sensor 21, then it is determined that the document size is A4R, otherwise if not, then it is determined that the document size is A5. Similarly, in a case that a primary-scanning-directional width of the document is the width of B5 or B4, if the document is detected by the document detection sensor 21, then it is determined that the document size is B4, otherwise if not, then it is determined that the document size is B5. Similarly, in a case that a primary-scanning-directional width of the document is the width of A4 or A3, if the document is detected by the document detection sensor 21, then it is determined that the document size is A3, otherwise if not, then it is determined that the document size is A4.

For example, the first movable member 22 is a rod-shaped member arranged in a hole 2b of the housing 2, and is pushed with a spring (not shown) to the document cover 7 and thereby contacts to the document cover 7, and moves in a direction substantially perpendicular to the platen glass 1 in accordance with opening and closing of the document cover 7.

The optical sensor 23 detects that the first movable member 22 moves over a predetermined position.

Here, the document detection sensor 21 and the optical sensor 23 are PI (Photo Interruption) sensors.

The second movable member 24 moves in a direction substantially parallel to the platen glass 1 in accordance with movement of the first movable member 22 when the first movable member 22 contacts.

The second movable member 24 includes a slope surface 24a, and a protrusion part 24b that protrudes in substantial parallel to the platen glass 1 from a top end part of the second movable member 24. The second movable member 24 moves in substantial parallel to the platen glass 1 from a reference position to the platen grass 1 side when a bottom end of the first movable member 22 contacts to the slope surface 24a. However, a movement distance of the second movable member 24 is limited with an upper limit value such that the second movable member 24 (the protrusion part 24b) does not move into a position under the platen glass 1.

The protrusion part 24b goes to the scanning area of the image scanning unit 15 when the second movable member 24 moves in substantial parallel to the platen glass 1. In a status that the bottom end of the first movable member 22 does not contact to the slope surface 24a, the protrusion part 24b is located outside of the scanning area; and in a status that the bottom end of the first movable member 22 contacts to the slope surface 24a, a part of the protrusion part 24b is located in the scanning area correspondingly to a position of the first movable member 22. Further, in its height direction, the protrusion part 24b is formed at a position not to contact to the carriage 3 or 4 even when the second movable member 24 moves.

The spring 25 returns the first movable member 22 to the reference position with restoring force thereof when the first movable member 22 moves upward and thereby releases the contact with the second movable member 24.

Figure 4:
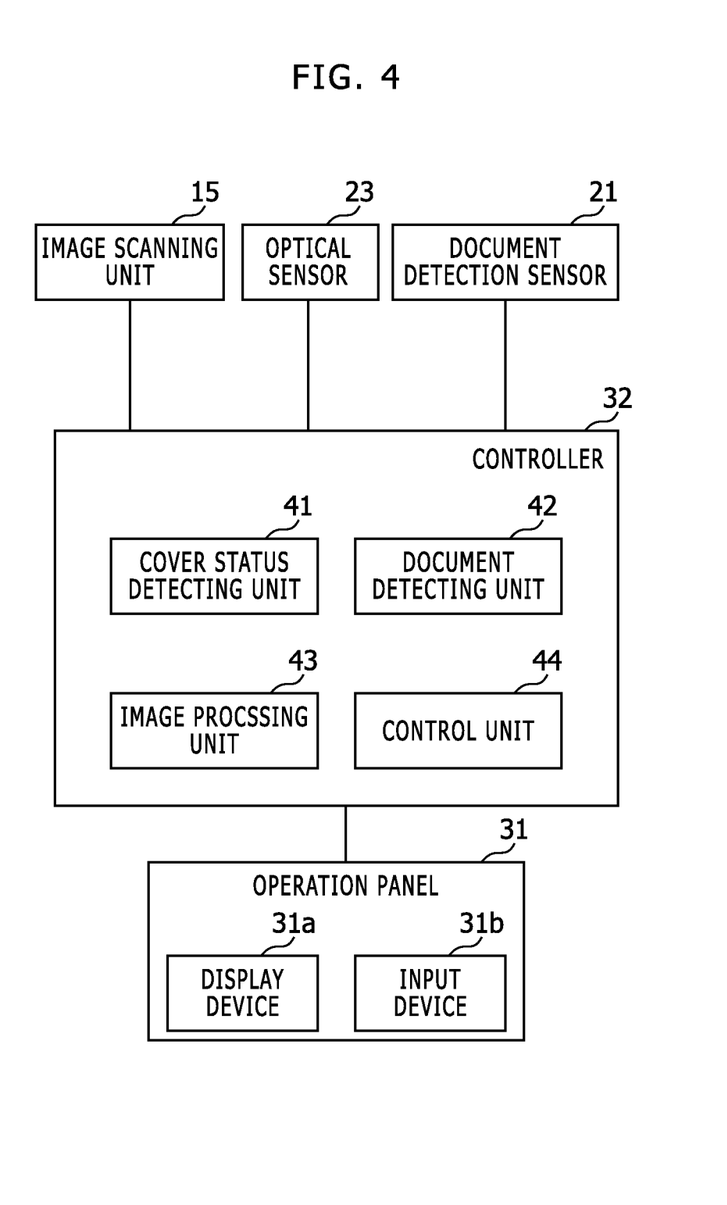
FIG. 4 shows a block diagram that indicates an electronic configuration of the image scanning apparatus shown in FIG. 1.

FIG. 4 shows a block diagram that indicates an electronic configuration of the image scanning apparatus shown in FIG. 1. As shown in FIG. 4, the image scanning apparatus shown in FIGS. 1 and 2 further includes an operation panel 31 and a controller 32.

The operation panel 31 is arranged on a surface of the housing 2, and includes a display device 31a such as a liquid crystal display, that displays sorts of information to a user, and an input device 31b such as a touch panel or a hard key, that receives a user operation.

The controller 32 controls an internal device such as the image scanning unit 15, and performs a data process such as image process. The controller 32 includes, for example, an ASIC (Application Specific Integrated Circuit), a computer that runs in accordance with a control program, and acts as processing units using the ASIC and/or the computer. Here, the controller 32 acts as a cover status detecting unit 41, a document detecting unit 42, an image processing unit 43, and a control unit 44.

The cover status detecting unit 41 obtains a scanned image from the image scanning unit 15, and detects a status of the document cover 7 on the basis of an image of the second movable member 24 (specifically, the protrusion part 24b) in the scanning area. Specifically, the cover status detecting unit 41 detects opening (i.e. cover angle) of the document cover 7 on the basis of a width of the image of the second movable member 24 in the scanning area. In this embodiment, the cover status detecting unit 41 detects the opening of the document cover 7 as a continuous value corresponding to the number of pixels of the width of the image (density changing area mentioned below) of the second movable member 24 in the scanning area.

Here, a color (i.e. reflectance) of a bottom surface 24c of the protrusion part 24b of the second movable member is set so as to be different from a color (i.e. reflectance) of the ceiling surface 2a of an inner wall of the housing 2, and consequently, in the scanned image, the image of the second movable member 24 is detected as an area having a pixel value different from a pixel value of its surrounding area (i.e. an image of the ceiling surface 2a). Hereinafter, this area is called "density changing area". For example, the color of the bottom surface 24c is set as a substantially white color, and the color of the ceiling surface 2a of the inner wall of the housing 2 is set as a substantially black color.

Figure 5:
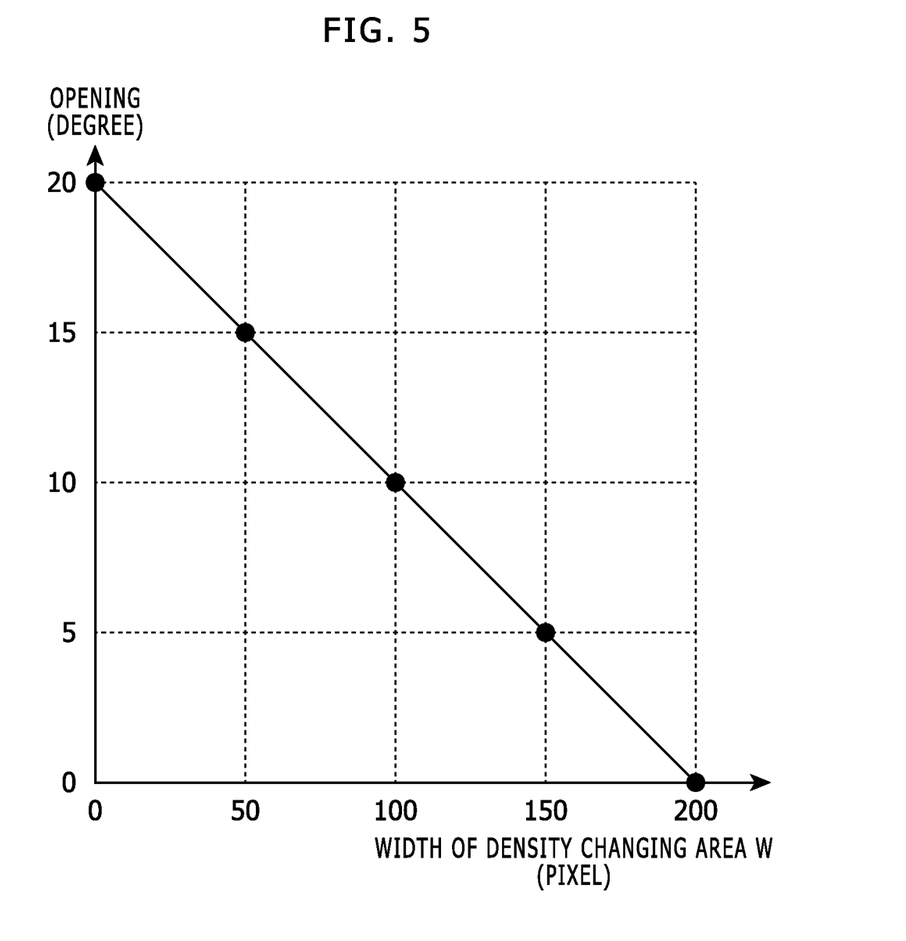
FIG. 5 shows a diagram that explains a relationship between a width W of a density changing area due to a second movable member 24 and opening of a document cover 7 in the image scanning apparatus shown in FIGS. 1 and 2.

FIG. 5 shows a diagram that explains a relationship between a width W of a density changing area due to a second movable member 24 and opening of a document cover 7 in the image scanning apparatus shown in FIGS. 1 and 2. As shown in FIG. 5, when the opening of the document cover 7 gets small, the movement distance of the second movable member 24 from the reference position gets long and the width W of the density changing area gets large linearly.

Further, in this embodiment, (a) if the optical sensor 23 detects that the first movable member 22 moves so as to exceed (come down) the predetermined position (i.e. if the opening of the document cover 7 is less than a predetermined value), then the cover status detecting unit 41 turns on the lamp 11 of the image scanning unit 15 and causes the image scanning unit 15 to scan the image, obtains the scanned image from the image scanning unit 15, determines a width W of an image of the second movable member 24 in the scanning area on the basis of the scanned image, and detects a status of the document cover on the basis of the width W; and (b) if the optical sensor 23 does not detect that the first movable member 22 moves so as to exceed the predetermined position (i.e. if the opening of the document cover 7 is equal to or larger than the predetermined value), then the cover status detecting unit 41 turns off the lamp 11 and does not perform the detection of a status of the document cover 7. Thus, when the document cover 7 keeps an opening status, the measurement of the opening of the document cover 7 is not performed, and consequently, irradiation light of the lamp 11 tends not to reach a user's eye.

The document detecting unit 42 determines a size of the document put on the platen glass 1 on the basis of: the status (the opening or the like) of the document cover 7 detected by the cover status detecting unit 41, an output value of the document detection sensor 21, and a primary-scanning-directional width of the document image scanned by the image scanning unit 15.

The image processing unit 43 performs image processes. For example, the image processing unit 43 extracts a document image from the scanned image on the basis of the document size detected by the document detecting unit 42.

The control unit 44 controls the image scanning unit 15 and thereby performs image scanning (a scan job, a copy job or the like) of a document in accordance with a user operation, and in the image scanning, for example, the control unit 44 detects a status of the document cover 7, determines a size of the document image using the document detecting unit 42, and extracts the document image from the scanned image using the image processing unit 43. The control unit 44 prints the extracted document image using a printing device (not shown), generates a file of the extracted document image, transmits the file using a communication device (not shown), and/or stores the file in a storage device (not shown).

Figure 6:
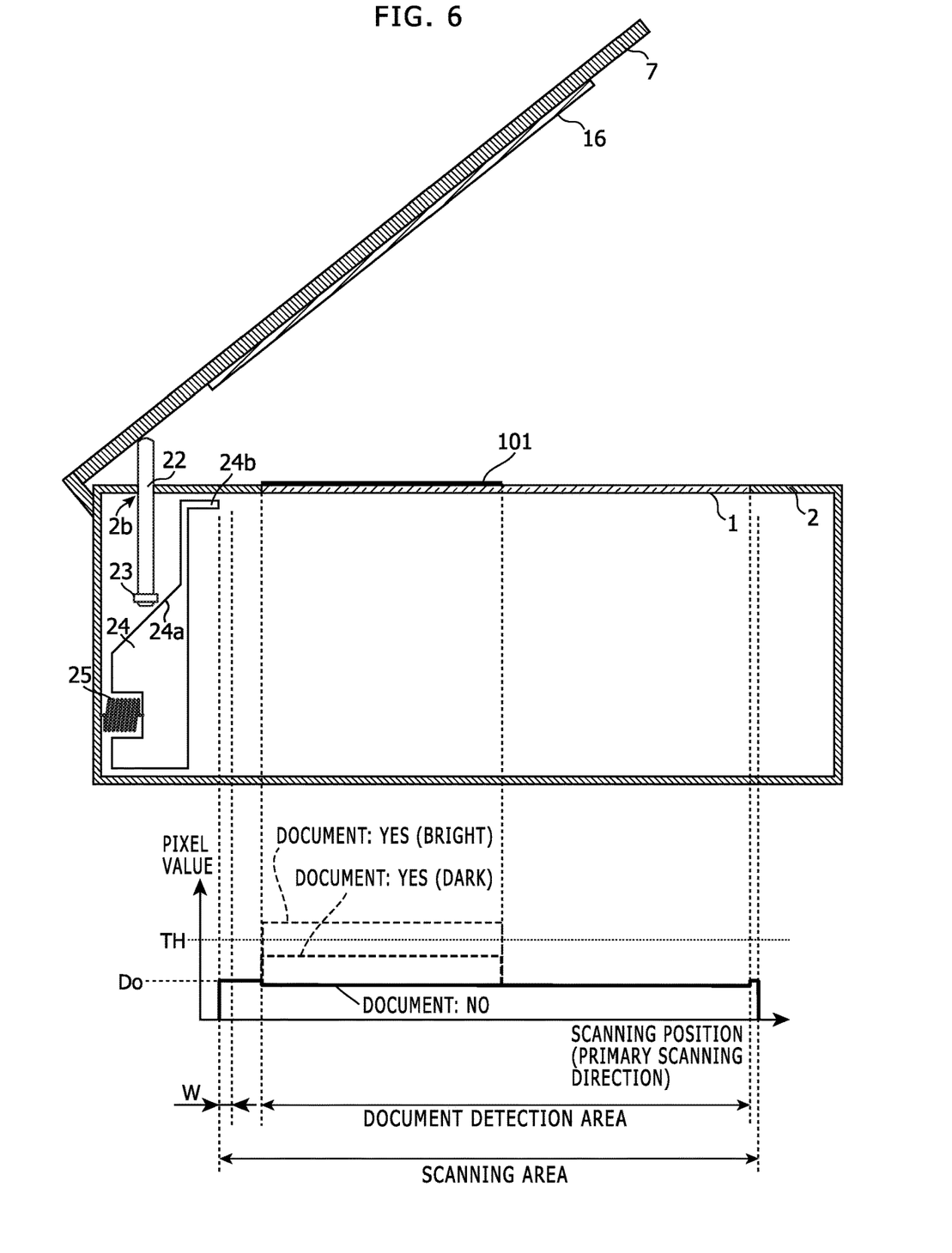
FIG. 6 shows a front view diagram that indicates movable members 22 and 24 in an intermediate opening status of the document cover 7 in the image scanning apparatus shown in FIGS. 1 and 2.
Figure 7:
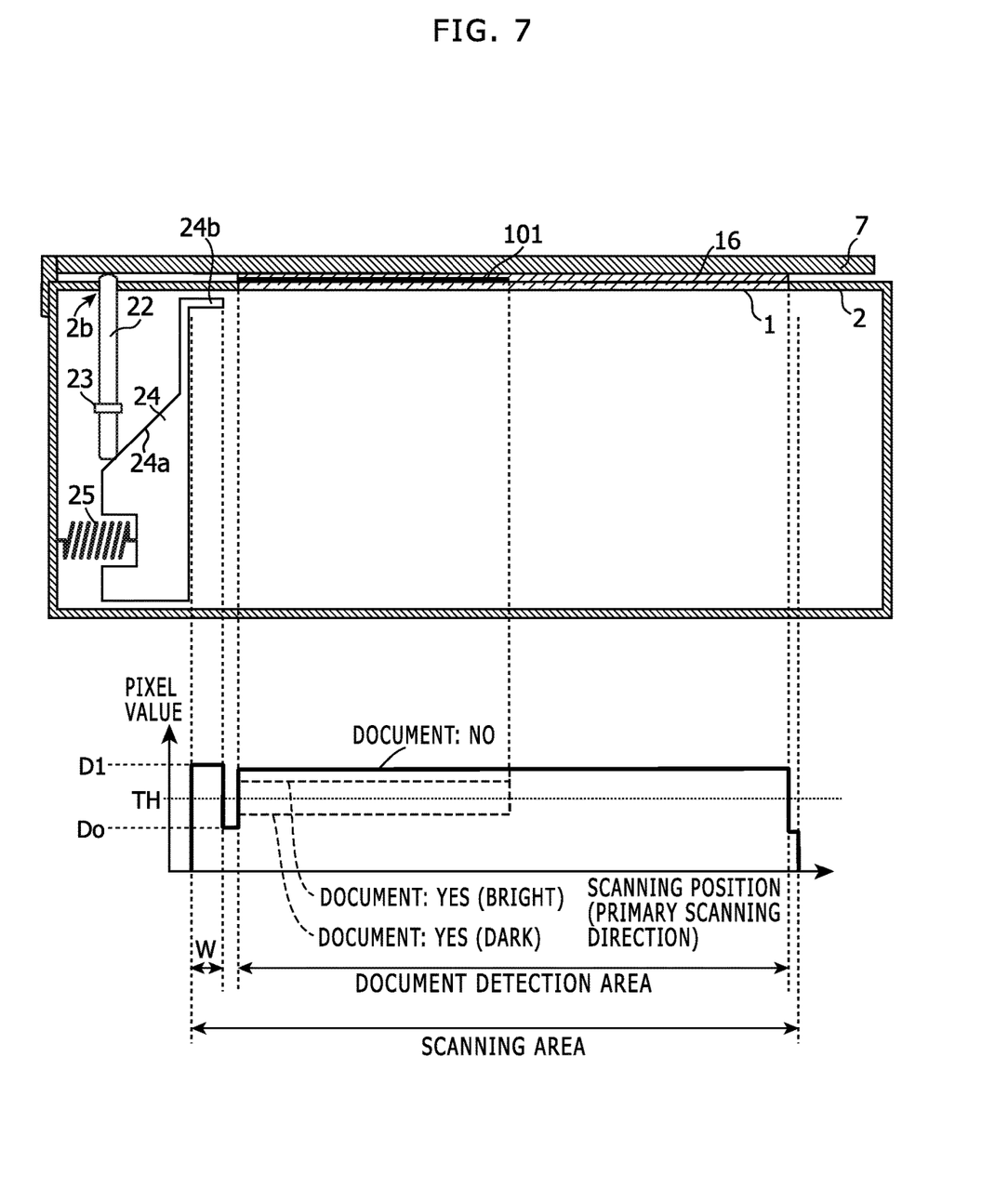
FIG. 7 shows a front view diagram that indicates the movable members 22 and 24 in a closing status of the document cover 7 in the image scanning apparatus shown in FIGS. 1 and 2.

The following part explains a behavior of the aforementioned image scanning apparatus. FIG. 6 shows a front view diagram that indicates movable members 22 and 24 in an intermediate opening status of the document cover 7 in the image scanning apparatus shown in FIGS. 1 and 2. FIG. 7 shows a front view diagram that indicates the movable members 22 and 24 in a closing status of the document cover 7 in the image scanning apparatus shown in FIGS. 1 and 2.

A user puts a document on the platen glass 1, and rotates the document cover 7 from an opening status to a closing status. During this operation, the cover status detecting unit 41 repeatedly performs image scanning at a predetermined scanning position as shown in FIG. 3, and watches opening of the document cover 7. As shown in FIGS. 6 and 7, a pixel value of an image of the ceiling surface 2a is substantially D0, a pixel value of an image of the protrusion part 24b is substantially D1, and the opening of the document cover 7 (cover angle) is detected on the basis of a width W of the density changing area.

Subsequently, as shown in FIG. 6, when the opening of the document cover 7 detected by the cover status detecting unit 41 gets a predetermined angle (e.g. 20 degrees) (i.e. when the document cover 7 gets an intermediate opening status), the document detecting unit 42 tries to detect a section having a pixel value that is equal to or higher than a predetermined threshold value TH in a pixel value distribution (density distribution) of a document detection range (i.e. a range corresponding to the platen glass 1) in the primary scanning direction of the current scanned image; and if the section is detected, the document detecting unit 42 determines a width of this section as a width (primary-scanning-directional width) of the document (bright document).

For example, the scanned image is expressed as 8-bit RGB data, and therefore, a maximum value of the pixel value is 255 and the threshold value TH is set as 127.

Afterward, as shown in FIG. 7, when the opening of the document cover 7 detected by the cover status detecting unit 41 gets substantially 0 degree (i.e. when the document cover 7 gets a closing status), the document detecting unit 42 tries to detect a section having a pixel value that is equal to or lower than a predetermined threshold value TH in a pixel value distribution (density distribution) of the document detection range in the primary scanning direction of the current scanned image; and if the section is detected, the document detecting unit 42 determines a width of this section as a width (primary-scanning-directional width) of the document (dark document).

If the aforementioned section is not detected in any of the intermediate opening status and the closing status, then the document detecting unit 42 determines that no documents are put.

Upon detecting the primary-scanning-directional width in the aforementioned manner, the document detecting unit 42 determines the document size on the basis of the primary-scanning-directional width and the detection result of the document detection sensor 21 in the aforementioned manner.

Subsequently, the control unit 44 causes the image scanning unit 15 to perform image scanning of a whole area of the document, and the image processing unit 43 extracts from the scanned image a document image of the document put on the platen glass 1 on the basis of the determined document size.

As mentioned, in the aforementioned embodiment, the image scanning unit 15 optically scans an image of a predetermined scanning area that includes the platen glass 1. The first movable member 22 moves in a direction substantially perpendicular to the platen glass 1 in accordance with opening and closing of the document cover. The second movable member 24 moves in a direction substantially parallel to the platen glass 1 in accordance with movement of the first movable member 22 when the first movable member 22 contacts. The cover status detecting unit 41 obtains a scanned image from the image scanning unit 15, and detects a status of the document cover 7 on the basis of an image of the second movable member 24 in the scanning area.

Consequently, a small number of optical sensors is sufficient, and therefore the opening of the document cover 7 (i.e. cover angle) is detected with a relatively low cost.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, a closing status of the document cover 7 is detected on the basis of a width W of the density changing area. Alternatively, when a largest pixel value of a predetermined detection area (an area that the density changing area may appear) is equal to or higher than a threshold value TH, it may be determined that the document cover 7 gets a closing status, or when a pixel value at a predetermined pixel position corresponding to the opening 0 degree is equal to or higher than a threshold value TH, it may be determined that the document cover 7 gets a closing status.

What is claimed is:

1. An image scanning apparatus, comprising:
    a platen glass on which a document is put;
    an image scanning unit configured to optically scan an image of a predetermined scanning area that includes the platen glass;
    a document cover configured to be capable of rotation and cover the platen glass;
    a first movable member configured to move in a direction substantially perpendicular to the platen glass in accordance with opening and closing of the document cover;
    a second movable member configured to move in a direction substantially parallel to the platen glass in accordance with movement of the first movable member when the first movable member contacts; and
    a cover status detecting unit configured to obtain the image from the image scanning unit and detect a status of the document cover on the basis of an image of the second movable member in the scanning area.

2. The image scanning apparatus according to claim 1 wherein the cover status detecting unit detects opening of the document cover on the basis of a width of the image of the second movable member in the scanning area.

3. The image scanning apparatus according to claim 2 wherein the cover status detecting unit detects the opening of the document cover as a continuous value corresponding to the number of pixels of the width of the image of the second movable member in the scanning area.

4. The image scanning apparatus according to claim 1 wherein
    the second movable member comprises a slope surface, and a protrusion part that protrudes in substantial parallel to the platen glass;
    the second movable member moves in substantial parallel to the platen glass when the first movable member contacts to the slope surface; and
    the protrusion part goes to the scanning area when the second movable member moves in substantial parallel to the platen glass.

5. The image scanning apparatus according to claim 1, further comprising an optical sensor configured to detect that the first movable member moves over a predetermined position;
    wherein the image scanning unit comprises a lamp that irradiates a scanning position with light, and an image sensor that detects reflected light from the scanning position as the image; and
    the cover status detecting unit (a) turns on the lamp and causes the image scanning unit to scan the image, obtains the image from the image scanning unit, and detects a status of the document cover on the basis of a width of an image of the second movable member in the scanning area, if the optical sensor detects that the first movable member moves so as to exceed the predetermined position, and (b) turns off the lamp and does not perform the detection of a status of the document cover, if the optical sensor does not detect that the first movable member moves so as to exceed the predetermined position.

* * * * *